Oct. 25, 1949.   C. G. MUNTERS   2,485,630
COLD STORAGE ROOM ARRANGEMENT HAVING
MEANS FOR CONTROLLING THE MOISTURE
CONTENT IN THE INSULATION
Filed Feb. 27, 1947   3 Sheets-Sheet 3

INVENTOR
Carl Gray Munters
BY
James C. Marble
His ATTORNEY

Patented Oct. 25, 1949

2,485,630

UNITED STATES PATENT OFFICE 2,485,630

COLD STORAGE ROOM ARRANGEMENT HAVING MEANS FOR CONTROLLING THE MOISTURE CONTENT IN THE INSULATION

Carl Georg Munters, Stockholm, Sweden

Application February 27, 1947, Serial No. 731,253
In Sweden March 1, 1946

13 Claims. (Cl. 62—6)

This invention relates to insulated cold storage rooms having means for controlling the moisture content in the insulation. To this end, the walls of the room are traversed by precooled and thus dried air, which, if it is not saturated, or if it is subjected to a temperature increase in the wall, will be capable of absorbing moisture present therein. Moisture always occurs in the form of hygroscopically bound water in the insulating material, where it is not of any practical disadvantage, particularly in the case of multi-layer insulations, but if the pressure of the vapor contained in the air reaches a value, at any point of the wall, corresponding to the pressure of saturated vapor at the temperature prevailing at the point in question, free water is precipitated, which in certain types of insulation impairs the insulating capacity to a very great extent, while also injuring the insulating material.

An example of operating conditions, under which the ventilating methods as hitherto practised are not satisfactory, is to be found in the so-called deepfreezing of food-stuffs and the like, when the temperature of the cold storage room is of the order of —20° C. and lower. At these low temperatures, the vapor pressure curve is very flat, that is to say, an alteration of the temperature by a few degrees alters the water-absorbing capacity of the air to a very slight extent only. Therefore, if prior to entering the wall of the cold storage room the air is caused to pass through the cold storage room proper or in a passage separated therefrom, and is cooled by an element for the absorption of heat, in a manner known per se, as hitherto, the heat losses are so large as to render the method impracticable. At —20° C., for example, the water absorbing capacity of the air is, with an increase of the temperature of 1° C. approximately five times less than at the same temperature increase from 0° C., the conditions remaining otherwise the same. In the former case, therefore, a quantity of ventilating air is required which is five times larger per unit of time, in order that the same effect of desiccation shall be attained. The moisture-absorbing capacity of the air varies in about the same proportion at a constant temperature, that is to say, from a certain partial saturation up to complete saturation. Consequently, if the percentage of moisture be increased from 80%, for example, to 100%, said capacity is approximately five times less at —20° C. than at 0° C.

On the other hand, if circulating air even if deeply cooled is introduced in the known manner at a point of the insulation which has a considerably higher temperature than that within the cold storage room, an impaired heat economy is obtained due to the fact that cooling power is lost. Again, if the insulation has no distinct circulation spaces for the drying air, so that the latter is compelled to find its own ways through the insulation, the main quantity of the air will flow in on the warm side of the insulation, inasmuch as the impelling column is the greatest here.

The present invention has for its general object to provide a novel solution, even under the above-named special conditions, of the moisture problem relative to the walls of cold storage rooms.

Further objects and advantages of the invention will be apparent from the following description considered in connection with the accompanying drawings, which form a part of this specification, and of which:

In the various figures, the same reference characters are used for similar parts.

Figure 1:
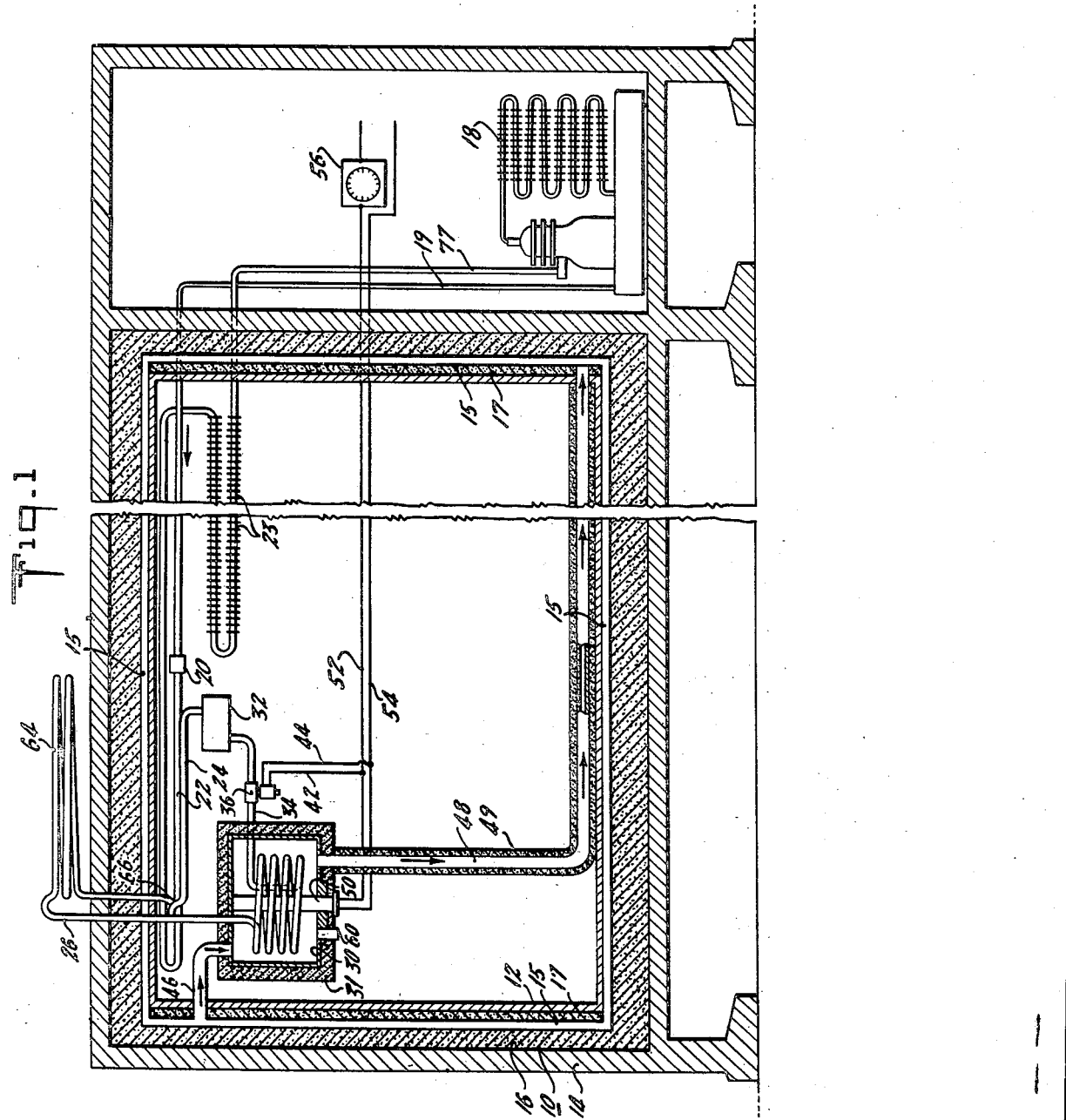
Fig. 1 is a vertical cross-sectional view of a cold storage room provided with ventilating means according to the invention.

In the drawings, 10 designates the walls of a cold storage room, which as herein used also includes the floor and the roof of the room. The walls may be of a type known per se having an inner covering or layer 12 and an outer covering or layer 14 and an insulating layer 16 arranged therebetween, the latter consisting, for instance, of cork or some multi-layer material. The coverings 12 and 14, of which the former may be fibre boards, or a heavier material in the floor, while the latter may be made from concrete, bricks or the like, are provided, preferably on the inside, with a heavy continuous coating of a material as impervious as possible to diffusion, preferably asphalt. In deepfreezing, or in such cases where the temperature of the cold storage room is always lower or practically always lower than that of its surroundings, it is advantageous, however, not to apply such a coating to the layer 12. Arranged adjacent to the layer 12 is a ventilation space 15 about the cold storage room, which in floors, and possibly roofs, is preferably located immediately adjacent to the layer 12, whereas at the vertical sides of the house there may be a layer 17 of insulating material between said space and the layer 12.

The cold storage room is cooled by means of a refrigerating plant 18 of a type known per se. Extending from this plant is a conduit 19 for liquid refrigerating medium, said conduit communicating through a reduction valve 20 with a conduit 22, wherein the cooling agent is evaporated, and which is in turn connected to cooling elements 23. The conduit 22 is in intimate heat-transfer relation with a pipe 24, one end of which communicates through a conduit 26 with a refrigerating coil 28 or the like, which is separated from the interior of the cold storage room by a casing 30, which is preferably surrounded by a layer 31 of insulating material. The other end of the conduit 24 communicates with a vessel 32 containing a readily volatile medium, such as dichlorodifluoromethane. The coil 28 is connected with the vessel 32 through a conduit 34, which latter has arranged therein a magnetically controlled valve 36 having a movable valve member 38. The latter is surrounded by a solenoid 40 which, when current is supplied to the same through wires 42 and 44, moves the valve member to its closed position, the valve member otherwise being opened by gravity or a spring. The valve 36 may also be operable manually.

Connected to the casing 30 are two conduits 46 and 48 communicating with the spaces 15 adjacent to the roof and the floor of the cold storage house on two diametrically opposed sides of the room. The conduit 48 is preferably heat-insulated from the air of the cold storage room, as indicated at 49. The conduits 46 and 48, the space 15 in the walls 10, and the casing 30 thus form a circulation system separated from the interior of the cold storage room. The casing 30 is disposed as close to the roof of the cold storage room as possible to provide for a great resulting impelling column for the ventilating air. Arranged in the casing 30 are one or more heating elements 50, which may be supplied with current through wires 52 and 54. Current to both the solenoid 40 and the heating element 50 may be periodically supplied through a time controlled switch 56. In heat conducting contact with the element 50 is a sleeve 60, the contact being effected over a metal body 58, for example, said sleeve having inserted therein a plug 62 of fibrous material or the like. The sleeve 60 with its plug 62 may be replaced by a water seal.

Figure 2:
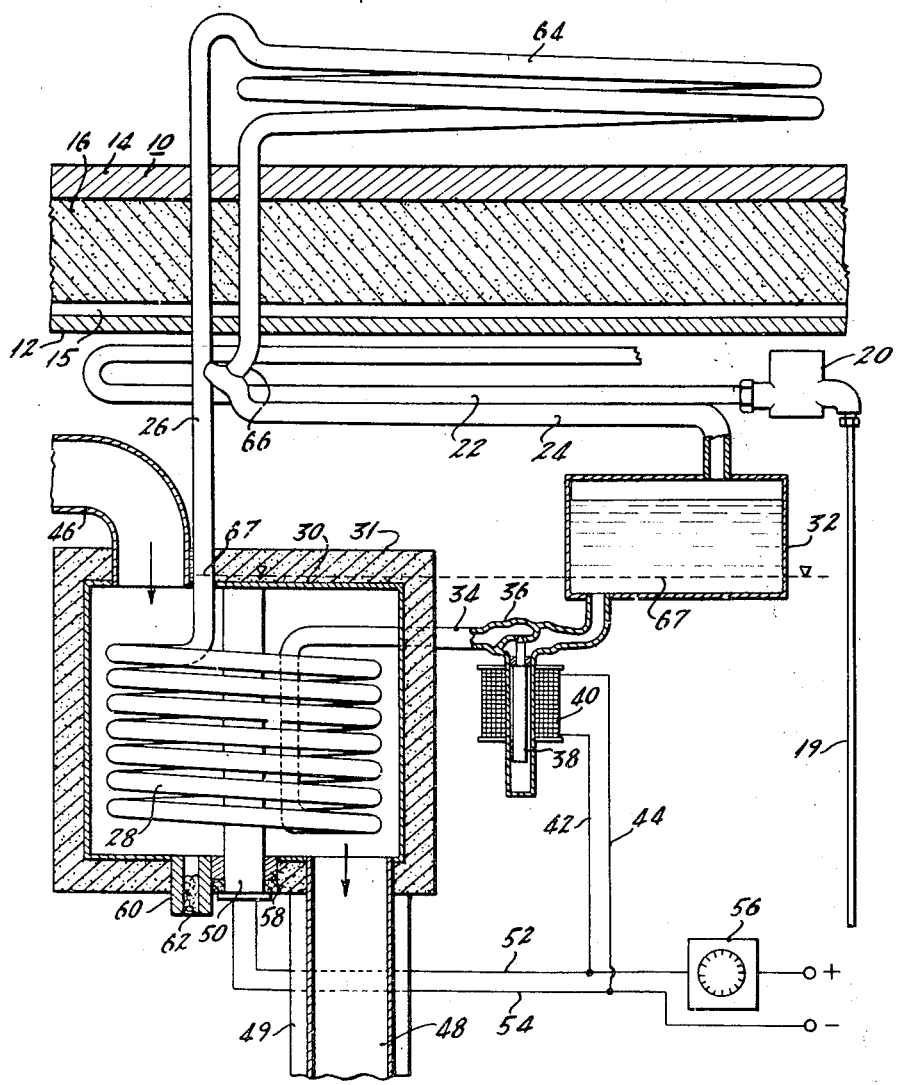
Fig. 2 shows a portion of the apparatus illustrated in Fig. 1, partly in section and on an enlarged scale.

In the embodiment according to Figs. 1 and 2, the pipe 26 is extended through the wall 10, where it is united with one end of a coil 64, which is thus located outside the cold storage room. The other end of the coil 64 is connected to the pipe 24 through a pipe 66 extending through the wall 10. This coil is useful only in localities where the outdoor temperature falls below that maintained within the cold storage room.

The arrangement operates in the following manner:

When the refrigerating plant 18 is in operations, the temperature outside the cold storage room being normally higher than within the same, the contents of the vessel 32 flows through the valve 36, which is assumed to be open, to the coil 28 up to a level 67. Inasmuch as the temperature in the conduit 22 and, consequently, also in the conduit 24, is lower than in the coil 28, as well as lower than in the cold storage room, the medium contained in the coil will evaporate and condense in the conduit 24, whence it flows back to the vessel 32. The heat which is then latent in the coil 28 cools down the circulating air entering the casing 30 from the conduit 46 to a temperature falling below that of the air in the cold storage room by 8–10° C. and more. The air thus cooled and desiccated flows through the conduit 48 to the wall of the cold storage room. Due to the fact that the circulating air when entering the walls of the cold storage room has a temperature, which thus falls below that of the air in the refrigerating chamber to a considerable extent, or a moisture content corresponding to that temperature, the circulating air will have a good moisture absorbing capacity imparted thereto. This capacity is thus many times greater for a certain quantity of air, than if the air is only cooled down to the temperature of the cold storage room. The cooling of the circulating air to the low temperature involves a certain consumption of energy, which is, however, to the greatest part not lost but is used for the benefit of the cold storage room by the fact that the circulating air is directed through the walls adjacent to the cold side thereof and thus cools down the air in the cold storage room. Between the layer, where the circulating air flows forward in the spaces 15, and the outside of the wall of the cold storage room, there is a heavy insulating layer, on account of which the heat drop, just described, will substantially occur.

During the drying of the circulating air, moisture is precipitated on the coil 28 in the form of snow or ice due to the fact that the temperature of this coil falls below 0° C. At certain intervals, the switch 56 supplies current to the heating element 50 while closing the valve 36 at the same time, so that liquid cannot flow from the vessel 32 to the coil 28. The heating element 50 melts the ice deposited on the coil 28, the water of condensation flowing off through the plug 62, which is likewise thawed by conduction of heat from the element 50 through member 58. During the defrosting period, the circulation through the ventilation system ceases almost entirely, inasmuch as the resulting impelling column becomes considerably smaller or equal to zero, when the absorption of heat in the casing 30 is replaced by a supply of heat. During this period, which is of course of short duration, the air in the casing 30, which is then relatively dry, consequently flows into the walls of the cold storage room to an insignificant extent only.

It will be seen from the above that the defrosting of the interior of the casing 30 may be effected without requiring any interruption of the absorption of heat by the refrigerating elements 23, inasmuch as they are separated from each other.

It is understood that the casing 30 may be disposed outside the cold storage room. In certain cases the switch 56 may be operable manually.

If the refrigerating unit is not used in winter because of the fact that the outer temperature is lower than that desired in the cold storage room, the above described cycle of operation will take place with the only difference that the coil 64 serves now as a condenser in place of the conduit 24, which is rendered inoperative automatically and is, in this case, only a return conduit for condensate from the coil 64 to the vessel 32.

Figure 3:
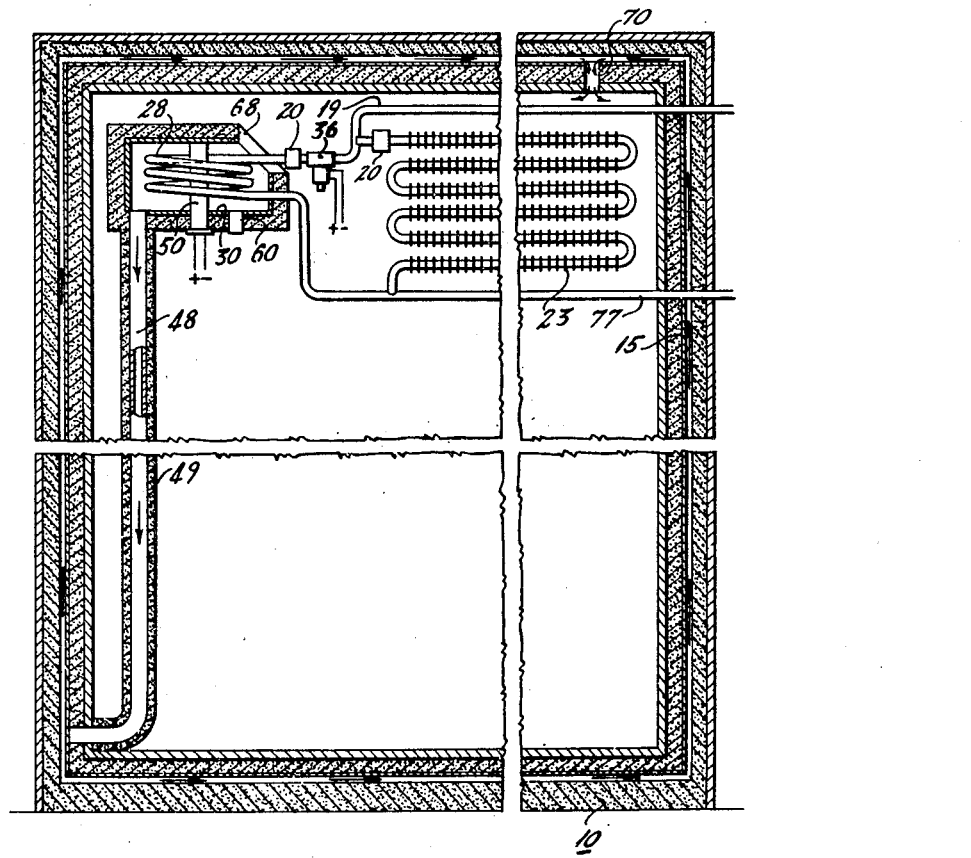
Fig. 3 is a vertical sectional view of a cold storage room according to a second embodiment of the invention.

The embodiment according to Fig. 3 differs from the preceding embodiment substantially in that the circulation system communicates with the air of the cold storage room. The casing 30 is thus open at the top, as indicated at 68, but is in communication through the insulated conduit 48 with the spaces 15 in the walls 10 of the cold storage room. At the roof, the spaces 15 are in direct communication with the refrigerating chamber through a channel 70.

When the refrigerating coil 28 is functioning, air enters the casing 30 through opening 68 from the cold storage room and is cooled down and dried by the coil 28, and flows through the conduit 48 to the spaces 15, which it passes in an upward direction, in order then to escape to the cold storage room through the passage 70.

In the embodiment according to Fig. 3, the coil 28 is connected in parallel with the conduit 19 for the refrigerating medium and the return conduit 77 for the evaporated cooling agent. Thus the coil is cooled directly by the cooling agent of the refrigerating plant. However, the valve 36 may be closed so as to shut off flow through coil 28, without interrupting flow through coil 23.

While two more or less specific embodiments of the invention have been shown, it is to be understood that the same are for purpose of illustration only, and that the invention is not to be limited thereby, but its scope is to be determined by the appended claims.

What is claimed:

1. A cold storage room comprising walls having inner and outer spaced wall surfaces, heat insulating material confined between said wall surfaces, there being a passage for flow of air between said wall surfaces in diffusion connection with said insulating material, conduit means connected to said passage for supplying air thereto, means in a portion of said conduit means to cool said air below the freezing point of moisture entrained therein whereby ice is formed in said portion, and means operative at intervals to melt said ice.

2. A cold storage room comprising walls having inner and outer spaced wall surfaces, heat insulating material confined between said wall surfaces, there being a passage for flow of air between said wall surfaces in diffusion connection with said insulating material, refrigerating means for removing heat from said room, conduit means connected to said passage for supplying air thereto, means in a portion of said conduit means to cool said air below the freezing point of moisture entrained whereby ice is formed in said portion, and means operative independently of said refrigerating means for periodically melting said ice.

3. A cold storage room comprising walls having inner and outer spaced wall surfaces, heat insulating material confined between said wall surfaces, there being a passage for flow of air between said wall surfaces in diffusion connection with said insulating material, refrigerating means for removing heat from said room, conduit means connected to said passage for supplying air thereto, a secondary refrigerating system having a first member in heat exchange relation with said refrigerating means and a second member in heat exchange relation with said conduit, said second member serving to cool said air below the freezing point of moisture entrained therein whereby ice is formed on the second member, and means to defrost said second member at intervals.

4. A cold storage room comprising walls having inner and outer spaced wall surfaces, heat insulating material confined between said wall surfaces, there being a passage for flow of air between said wall surfaces in diffusion connection with said insulating material, refrigerating means for removing heat from said room, conduit means connected to said passage for supplying air thereto, a secondary refrigerating system having a condenser in heat exchange relation with said refrigerating means and an evaporator in heat exchange relation with said conduit, said evaporator serving to cool said air below the freezing point of moisture entrained therein whereby ice is formed on the evaporator, and means in said secondary refrigerating system between said condenser and evaporator for interrupting the supply of refrigerant to the latter independently of the operation of said refrigerating means.

5. A cold storage room comprising walls having inner and outer spaced wall surfaces, heat insulating material confined between said wall surfaces, there being a passage for flow of air between said wall surfaces in diffusion connection with said insulating material, refrigerating means including a first cooling coil for conducting refrigerant to remove heat from said room, conduit means connected to said passage for supplying air thereto, a second cooling coil in heat exchange relation with said conduit to cool said air below the freezing point of moisture entrained therein whereby ice is formed on said second coil, conduits connecting said second coil in parallel with said first coil, and means for interrupting flow of refrigerant through said conduits to said second coil independently of flow through said first coil.

6. A cold storage room comprising walls having inner and outer spaced wall surfaces, heat insulating material confined between said wall surfaces, there being a passage for flow of air between said wall surfaces in diffusion connection with said insulating material, refrigerating means for removing heat from said room, conduit means connected to said passage for supplying air thereto, a cooling element in heat exchange relation with said conduit means to cool said air below the freezing point of moisture entrained therein whereby ice is formed on said element, means for transferring heat absorbed by said element to said refrigerating system, a heating element adjacent to said cooling element, and means for interrupting the cooling effect of said cooling element independently of the operation of said refrigerating system and for simultaneously activating said heating element to melt said ice.

7. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface and means for removing moisture from the air circulating through said passage.

8. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, and means for supplying said passage with cold dried air.

9. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, means forming a chamber, means for removing heat from the air in said chamber to precipitate moisture from the air and conduit means connecting said chamber with one of said apertures.

10. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, means forming a chamber, means for removing heat from the air in said chamber to precipitate moisture from the air and a pair of conduits connecting spaced places of said chamber with the respective spaced apertures.

11. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, means forming a chamber, means for removing heat from the air in said chamber to precipitate moisture from the air, said chamber being formed with an outlet for condensate and a conduit connecting said chamber with one of said apertures.

12. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, means forming a chamber, refrigerating means for cooling air in said chamber to a temperature below the freezing temperature of water and a conduit connecting said chamber with one of said apertures.

13. A cold storage room comprising walls having heat insulating material confined between spaced inner and outer wall surfaces, said walls being formed to provide a passage therein for circulation of air through the walls, said passage being so located in the walls that for at least the greater portion of the length of the passage more insulation is disposed between the passage and said outer wall surface than between the passage and said inner wall surface, said walls being provided with spaced apertures communicating with said passage, means forming a chamber, refrigerating means for cooling air in said chamber to a temperature below the freezing temperature of water, a conduit connecting said chamber with one of said apertures, and means for defrosting said refrigerating means.

CARL GEORG MUNTERS.

REFERENCES CITED

The following references are of record in the file of this patent:

UNITED STATES PATENTS

| Number | Name | Date |
| --- | --- | --- |
| 2,150,182 | Munters | Mar. 14, 1939 |
| 2,151,713 | Niemann | Mar. 28, 1939 |
| 2,411,461 | Philipp | Nov. 19, 1946 |

Certificate of Correction

Patent No. 2,485,630 October 25, 1949

CARL GEORG MUNTERS

It is hereby certified that errors appear in the printed specification of the above numbered patent requiring correction as follows:

Column 3, lines 65 and 66, for the word "operations" read *operation*; column 5, line 54, after "entrained" insert *therein*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*